(12) United States Patent
Chen

(10) Patent No.: US 7,398,184 B1
(45) Date of Patent: Jul. 8, 2008

(54) ANALYZING EQUIPMENT PERFORMANCE AND OPTIMIZING OPERATING COSTS

(75) Inventor: Yu-Gene T. Chen, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/784,631

(22) Filed: Apr. 9, 2007

(51) Int. Cl.
 *G06F 11/30* (2006.01)
 *G06F 15/00* (2006.01)

(52) U.S. Cl. ...................... 702/182; 702/185

(58) Field of Classification Search ............ 702/182, 702/183, 185, 186, 189, 34
See application file for complete search history.

(56) References Cited

U.S. PATENT DOCUMENTS

| | | | |
|---|---|---|---|
| 6,691,068 B1 * | 2/2004 | Freed et al. | 702/187 |
| 2003/0204371 A1 * | 10/2003 | Sciamanna | 702/183 |
| 2004/0254764 A1 * | 12/2004 | Wetzer et al. | 702/184 |

FOREIGN PATENT DOCUMENTS

GB 2176640 A * 12/1986

* cited by examiner

*Primary Examiner*—Bryan Bui
(74) *Attorney, Agent, or Firm*—Munck Carter, P.C.

(57) ABSTRACT

A system and method for analyzing equipment performance and optimizing operational costs are provided. Data from a sensor associated with a piece of equipment is analyzed and processed to identify characteristics associated with the performance and operational costs of the equipment. If the analysis indicates that abnormal conditions exist or that any user-defined alerts are warranted, a message is sent to an operator terminal. The system and method may continue to monitor the equipment and thus provide real-time data. The data may be stored in memory and collected over time. The data may be associated with a digital signature and used to create performance and/or financial reports for financial institutions, company quality control boards, regulatory control agencies, and the public. The system and method thus provide a cost effective and reliable analysis of equipment performance and operation costs.

20 Claims, 2 Drawing Sheets

ANALYZING EQUIPMENT PERFORMANCE AND OPTIMIZING OPERATING COSTS

TECHNICAL FIELD

This disclosure relates generally to equipment analysis and more specifically to analyzing equipment performance and optimizing operating costs.

BACKGROUND

Conventional systems and methods for monitoring the structural integrity of equipment often fail to predict whether the equipment will still operate within a safe operating envelope after damage or corrosion has occurred. Moreover, conventional practices often fail to determine a safe operating envelope for the equipment.

In some instances, conventional practices often fail to predict structural degradation, such as metal loss or pressure weakening due to corrosion, strain, pressure, temperature, pH, and other environmental variables. In addition, conventional system and methods often fail to determine the financial implications of using different operating envelopes and/or conditions.

For these and other reasons, conventional systems and methods often fail to model or predict equipment performance, which could be used in optimizing operating conditions and reducing costs.

SUMMARY

This disclosure provides an equipment performance analyzing and cost optimizing system and method.

In a first embodiment, a system includes a memory operable to store data, where the data is associated with performance of equipment. The system also includes a processing module operable to process the data to identify one or more characteristics associates with the performance of the equipment.

In a particular embodiment, the data may include an electrical property, a mechanical property, a chemical property, a physical property, or an operational property.

In other particular embodiments, the one or more characteristics may include an equipment longevity, an abnormal condition, a safety rating, an industry standard, or a user-defined threshold.

In a second embodiment, a method includes correlating data associated with performance of equipment and a desired performance characteristic associated with the equipment. The method also includes storing performance data associated with the correlated data.

In a third embodiment, a computer program is embodied on a computer readable medium. The computer program includes computer readable program code for correlating data associated with performance of equipment and a desired performance characteristic associated with the equipment. The computer program also includes computer readable program code for storing performance data associated with the correlated data.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
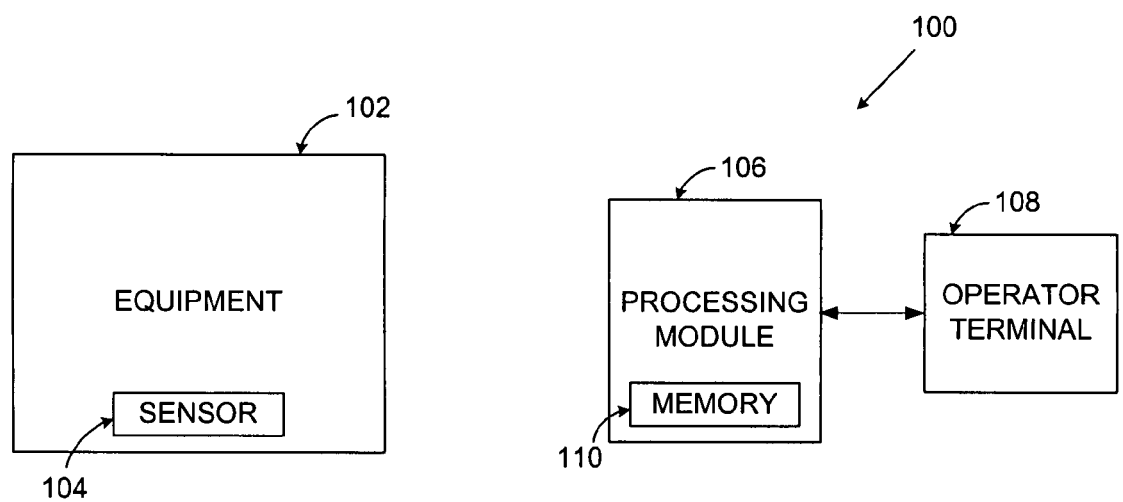
FIG. 1 illustrates an example equipment performance and operating cost analysis system.

FIG. 1 illustrates an example equipment performance and operating cost analysis system 100. The embodiment of the system 100 shown in FIG. 1 is for illustration purposes only and is not drawn to scale. Other embodiments of the system 100 may be used without departing from the scope of this disclosure. Also, the system 100 may be used in any suitable application. Although shown in FIG. 1 and described as analyzing one piece of equipment 102, the system 100 could also monitor and analyze several pieces of equipment or multiple areas of the same equipment at any given time.

The system 100 uses a sensor 104 to monitor the activities or performance characteristics of the equipment 102. The sensor 104 could include any suitable structure for monitoring the equipment 102, such as a wireline sensor, wireless sensor, transducer, or direct-indicating sensor. As particular examples, the sensor 104 could includes an electrical sensor, mechanical senor, pressure sensor, resistance sensor, current sensor, voltage sensor, power sensor, magnetic sensor, gas flow sensor, fluid flow sensor, temperature sensor, humidity sensor, chemical sensor, light sensor, sound sensor, motion sensor, position sensor, orientation sensor, radiation detector, infrared detector, ultrasound detector, metal detector, or other suitable sensor.

The data collected by the sensor 104 is analyzed in a processing module 106. The data may be transferred directly from the sensor 104 to the processing module 106 by a wireline or a wireless connection. The data could also be stored on a storage medium, such as a disk or removable memory device, and then transferred to the processing module 106. In addition, the data may be transferred from the sensor 104 to a processor or controller associated with the equipment 102 before being analyzed in the processing module 106.

The processing module 106 may represent any suitable hardware, software, firmware, or combination therefore (such as a processor, controller, or computer program) capable of analyzing the data. The processing module 106 may be external to the equipment 102 as shown in FIG. 1 or may be part of the equipment 102.

The analysis performed by the processing module 106 may include identifying and/or recognizing characteristics, variables, or patterns associated with the equipment's performance monitored by the sensor 104. The analysis may also include providing theoretical operating parameters tailored to the equipment 102 for continued operating at a certain capacity or for allowing operation at an optimized level. The theoretical operating parameters could include relationships based on principals of operating costs, engineering, manufacturer guidelines, safety guidelines, safety ratings, and/or industry standards.

The processing module 106 could further determine whether the equipment 102 will remain operating at safe operating conditions should an abnormal condition occur. As a particular example, the processing module 106 could correlate the data collected by the sensor 104 with characteristics associated with possible structural or operational degradation of the equipment 102, such as metal loss, corrosion, strain, pressure, temperature, and pH levels and thus aid in operating decisions. As another particular example, the data analysis could include taking into account operating costs, such as the value of a produced product, maintenance measures, upgraded equipment, current business demands, future business demands, and/or depreciation of the equipment 102.

After correlating and processing the data with desired characteristics associated with the equipment 102, the processing module 106 may monitor whether any abnormal conditions exist or any user-defined alerts are warranted. The user-defined alerts may include warning an operator that the equipment 102 may be approaching a particular threshold, cost limit, or potentially unsafe condition. As a particular example, the abnormal condition and/or user alert may represent a message, alert, alarm, or process variable having a common protocol format such as OPC, Modbus, HART, Foundation Fieldbus, or Profibus.

If any abnormal condition exists or user-defined alerts are warranted, the processing module 106 sends the pertinent message or alert to an operator terminal 108. The processing module 106 may also send a suitable command to the equipment 102. As a particular example, if any abnormal condition exists, the processing module 106 may send a warning, shut-down message, or lock-down order to the equipment 102. As another particular example, the processing module 106 may send a warning, shut-down message, or lock-down order to a processor, controller, multi-variable controller, or optimizer associated with the equipment 102.

The operator terminal 108 may represent any suitable terminal, monitor, or apparatus suitable for monitoring or displaying data associated with the system 100. The operator terminal 108 may be located external to the equipment 102 and the processing module 106 as shown in FIG. 1 or may be part of the equipment 102, the processing module 106, or both.

After sending a pertinent message or alert, the processing module 106 may continue to analyze data from the sensor 104. Optionally, an operator using the operator terminal 108 can request certain data or data reports from the processing module 106. For example, the operator using the operator terminal 108 may request a certain performance characteristic, performance report, or cost analysis report from the processing module 106. As a particular example, the operator using the operator terminal 108 may request that a specific performance characteristic be monitored over a period of time. The requested data, in turn, may be displayed in graphical, tabular, or other suitable form to the operator terminal 108 for the operator's review. Thus, the system 100 may continuously analyze the performance of the equipment 102 and provide real-time data. The data may also be used to control operation of the equipment 102 to remain within particular operating criteria.

In addition, the data used, collected or generated by the processing module 106 may be stored in a memory 110. The memory 110 may be part of the processing module 106 as shown in FIG. 1 or may be located external to the processing module 106. A digital signature may be associated with the data for later use, such as for reporting to company quality control boards, regulatory control agencies, and the public. The digital signature may be used as an authentication mechanism to, for example, certify that the data is pristine and free of any manipulation. The stored data may also be analyzed over time to produce comprehensive performance reports showing, for example, how the equipment 102 performs in different operating envelopes. Accordingly, the system 100 provides a cost effective and reliable technique for real-time analysis and long term equipment degradation studies.

Data used, correlated, or generated in the processing module 106 may also be stored in order to conduct comparisons with other equipment or systems of equipment. The data could also be used to provide predictive financial impact reports based on historical data and/or projections made by the system 100 or in conjunction with other financial tracking systems. In addition, the data may be used to alert the local plant or a nearby community of any dangerous equipment failures or potential meltdowns. Such warnings may be made available using standard data formats for use by financial institutions, local communities, neighborhood watch groups, government agencies, publicly accessed alert systems, media, and historians.

The system 100 could be part of a heat exchanger that monitors input flow, inlet temperature, inlet pressure and corrosion in the inlet using the sensor 104. The sensor 104 could also monitor the outlet temperature, output pressure and output flow. Based on readings from the sensor 104, common thermodynamic calculations could be correlated to determine the heat transfer efficiency and compared against the manufacturers rating of efficiency. These calculations could determine if the equipment is operating at the manufacture's rated efficiency. Additionally, the calculated mass flow rates based on readings from the sensor 104 could also be used to perform mass balance calculations to determine if, for example, there is a tube link in the exchanger. Fluid cost inputs (e.g., fluid traveling through the heat exchanger) could also be input to or be correlated within the processing module 106. Accordingly, a computer program associated with the processing module 106 could determine the cost of the "fluid loss" and increase in energy costs when the heat exchanger is not running at peak efficiency.

In addition, the processing module 106 could compare current operating costs and calculate an optimal maintenance cycle for the heat exchanger based on operating costs, maintenance labor, cost of having the heat exchanger out of service and compare that with the value of the end product that the heat exchanger is helping to produce. The processing module 106 could then calculate the optimal maintenance cycle for the heat exchanger (as well as alarm on if a leak of "x" mass loss exists; where "x" is user configurable).

Most pressurized equipment built for corrosive environments have a lifetime corrosion rating. For example, the sensor 102 could measure and report factors such as the corrosion rate (mils/year or mm/year which is a report of metal loss), pitting factor (dimensionless value that indicates presence of a pitting corrosion environment), B value (calculated version of the Stern Geary constant), corrosion mechanism indicator (determines if scaling vs. corrosion is occurring). These measured variables could be used either alone or with other collaborative measurements (depending on the actual system) to determine scaling, corrosion life, and metal loss (since the corrosion sensor was installed). The processing module 106 could correlate these four corrosion factors against changes in efficiency (and/or performance) of the equipment as well as against the operating controls settings and environment to determine the affects that running/operating conditions have on corrosion, pitting, scaling, and metal loss.

Real-time measurement and reporting of corrosion variables such as corrosion rate, pitting factor, B value and corrosion mechanism initiator could be used to augment the pressure, temperature, and flow measurements taken for the system 100. Real-time measurement and reporting of corrosion variable could also be used to optimize on maintenance cycle calculations and calculate the lifespan remaining based on metal loss and/or the corrosion rating. Accordingly, the processing module 106 could alert end-users that the system 100 or any equipment associated with the system 100 of lower operating envelopes. In addition, the processing module 106 could inform the operations group that damage to the equipment is occurring so that "active" decisions could be made to allow the damage to occur so that short-term financial gains (e.g., increased throughput to generate saleable product) could be achieved. Alternatively, the processing module 106 could be configured with financial data for production values and thus generate a report or alert that recommends the most efficient course of action.

Accordingly, the system 100 lowers the cost of instrumentation deployment and provides automated, real-time measurements that enable applications to analyze and correlate real-time performance and optimization calculations. With "real-time" readings, the delay in correcting poor performing equipment (due to leaks, scaling, or other conditions) could be reduced and alerts can be generated to allow the operations manager to make a conscious decision to run in a non-optimized mode versus unknowingly undergoing financial loss due to lack of information or untimely information.

Accordingly, system 100 provides a cost effective and reliable technique for real-time analysis and long-term equipment degradation studies. Other embodiments of the system 100 may be used without departing from the scope of this disclosure. For example, the system 100 may be implemented as part of or in conjunction with a controller or other existing monitoring system. As another example, the system 100 may be implemented as part of a computer program embodied on a computer readable medium and capable of being executed by a processor.

Figure 2:
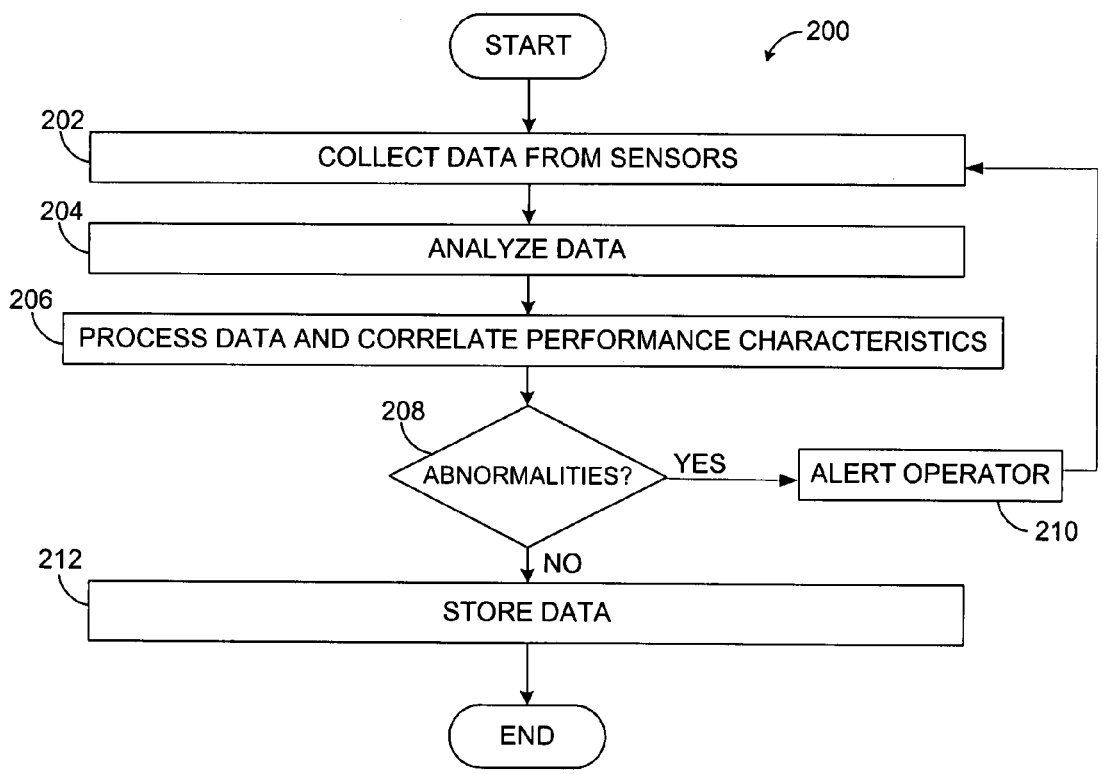
FIG. 2 illustrates an example method for analyzing equipment performance and operating costs.

FIG. 2 illustrates an example method 200 for analyzing equipment performance and operating costs. For ease of explanation, the method 200 is described as being used in conjunction with the system 100 of FIG. 1. The method 200, however, may be used with any other suitable system. Also, other embodiments of the method 200 may be used without departing from the scope of this disclosure.

Data from a sensor or a series of sensors is collected at step 202. This could include collecting data from the sensor 104. At step 204, the data from the sensor or series of sensors are analyzed. This could include, for example, using the processing module 106. The analysis performed by the processing module 106 may include identifying and/or recognizing operating costs, characteristics, variables, or patterns associated with the performance monitored by the sensor 104. The analysis may also determine whether the equipment 102 will remain operating within safe operating conditions should an abnormal condition occur.

The analysis may further include providing theoretical operating parameters tailored to the equipment 102 for continued operation at a certain cost capacity or for allowing operation at an optimized level. As a particular example, the processing module 106 could correlate the data collected by the senor 104 with characteristics associated with possible structural or operational degradation of the equipment 102, such as metal loss, corrosion, strain, pressure, temperature, and pH levels and thereby aid in operating decisions. As another particular example, the data collected from the senor 104 may be correlated with the cost of operating the equipment 102 at the current or a predicted operation condition. The data analysis could include taking into account operation costs such as the value of a produced product, maintenance measures, upgraded equipment, current business demands, future business demands, and/or depreciation of the equipment 102.

At this point, a determination is made as to whether any abnormal conditions or any user-defined alerts are warranted at step 208. The user-defined alerts may includes warning an operator that the equipment may be approaching a particular threshold or potentially unsafe condition.

If any abnormal condition exists or a user-defined alert is indeed warranted, a pertinent message or alert is sent to an operator at step 210. As a particular example, if any abnormal condition exists, the processing module 106 may send a warning, shut-down message, or lock-down order to the equipment 102. As another particular example, the processing module 106 may send a warning, shut-down message, or lock-down order to a processor, controller, multi-variable controller, or optimizer associated with the equipment 102.

The method 200 then returns to step 202 to collect more data from the sensor 102, if required. Thus, the method 200 can continuously analyze an abnormal condition by analyzing new data or sets of data and provide real-time data accordingly.

Otherwise, if no abnormal condition exists or alert is warranted at step 208, various data can be stored at step 212. This could include, for example, storing the data collected in step 202, the analysis results from step 204, and/or the correlated data and desired characteristic(s) found in step 206. The data may be stored with a digital signature for later use, such as reporting to financially concerned entities, company quality control boards, regulatory control agencies, and the public. At this point, the method 200 could end or return to step 202.

Accordingly, the method 200 provides a cost effective and reliable method for real-time analysis of equipment performance and cost effectiveness. Other embodiments of the method 200 may be used without departing from the scope of this disclosure. For example, the method 200 may be implemented as part of or in conjunction with a controller or other existing monitoring systems. As another example, the method 200 may be implemented as part of a computer program embodied on a computer readable medium and capable of being executed by a processor.

In some embodiments, various functions described above are implemented or supported by a computer program that is formed from a computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alternations and permutations of these embodiments and methods will be apparent to those skilled in the art. Accordingly, the above description of example embodiments does not define or constrain this disclosure. Other changes, substitutions, and alternations are also possible without departing from the spirit and scope of this disclosure, as defined by the following claims.

What is claimed is:

1. A system comprising:
a memory operable to store data associated with a piece of equipment, the data including a metal loss associated with the piece of equipment; and
a processing module operable to process the data to identify one or more characteristics associated with the piece of equipment, wherein the one or more characteristics include an operating parameter associated with the piece of equipment, the operating parameter designed for continued operation of the piece of equipment in light of the metal loss, the processing module further operable to output the operating parameter.

2. The system of claim 1, wherein the processing module is further operable to identify the metal loss based on a corrosion rate, a pitting factor, a B value, and a corrosion mechanism indicator associated with the piece of equipment.

3. The system of claim 1, wherein the one or more characteristics further comprise a maintenance cycle associated with the piece of equipment and a remaining lifespan associated with the piece of equipment.

4. The system of claim 1, wherein the one or more characteristics further comprise an operating cost associated with operating the piece of equipment using the identified operating parameter.

5. The system of claim 1, wherein the piece of equipment comprises one of multiple pieces of equipment, and the processing module is operable to identify the one or more characteristics associated with each of the multiple pieces of equipment.

6. The system of claim 1, further comprising a sensor operable to collect the data.

7. The system of claim 6, wherein the sensor comprises a wireless sensor.

8. The system of claim 1, wherein the processing module is further operable to store the one or more characteristics in the memory along with authentication information.

9. The system of claim 1, wherein the processing module is further operable to output a warning message to an operator terminal when performance of the piece of equipment exceeds at least one of: an abnormal condition and a user-defined level.

10. A method comprising:
analyzing data associated with a piece of equipment to identify a metal loss associated with the piece of equipment;
identifying one or more characteristics associated with the piece of equipment, wherein the one or more characteristics include an operating parameter associated with the piece of equipment, the operating parameter designed for continued operation of the piece of equipment in light of the metal loss; and
outputting the identified operating parameter.

11. The method of claim 10, wherein the data comprises a corrosion rate, a pitting factor, a B value, and a corrosion mechanism indicator associated with the piece of equipment.

12. The method of claim 10, wherein the analyzing occurs in real-time.

13. The method of claim 10, wherein the one or more characteristics further comprise a maintenance cycle associated with the piece of equipment and a remaining lifespan associated with the piece of equipment.

14. The method of claim 10, wherein the one or more characteristics further comprise an operating cost associated with operating the piece of equipment using the identified operating parameter.

15. The method of claim 10, wherein the piece of equipment comprises one of multiple pieces of equipment, and the data comprises data associated with each of the multiple pieces of equipment.

16. The method of claim 10, further comprising storing the one or more characteristics and authentication information.

17. The method of claim 10, further comprising outputting a warning message to an operator terminal when performance of the piece of equipment exceeds at least one of: an abnormal condition and a user-defined level.

18. A computer program embodied on a computer readable medium, the computer program comprising computer readable program code for:
analyzing data associated with a piece of equipment to identify a metal loss associated with the piece of equipment;
identifying one or more characteristics associated with the piece of equipment, wherein the one or more characteristics include an operating parameter associated with the piece of equipment, the operating parameter designed for continued operation of the piece of equipment in light of the metal loss; and
outputting the identified operating parameter.

19. The computer program of claim 18, further comprising outputting a warning message to an operator terminal when performance of the piece of equipment exceeds at least one of: an abnormal condition and a user-defined level.

20. The computer program of claim 18, further comprising computer readable program code for storing the one or more characteristics and authentication information.

* * * * *